(12) United States Patent
Dinsdale et al.

(10) Patent No.: US 8,851,510 B1
(45) Date of Patent: Oct. 7, 2014

(54) CURTAIN AIRBAG ASSEMBLY WITH A REINFORCED REGION

(71) Applicant: Autoliv ASP, Inc., Ogden, UT (US)

(72) Inventors: Charles Paul Dinsdale, Farr West, UT (US); Roger Rickenbach, Farr West, UT (US); Tyler Christiansen, Orem, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 13/842,115

(22) Filed: Mar. 15, 2013

(51) Int. Cl.
*B60R 21/16* (2006.01)
*B60R 21/235* (2006.01)
*B60R 21/231* (2011.01)
*B60R 21/21* (2011.01)

(52) U.S. Cl.
CPC ......... *B60R 21/23138* (2013.01); *B60R 21/235* (2013.01); *B60R 21/21* (2013.01)
USPC .................. 280/730.2; 280/743.1; 280/743.2

(58) Field of Classification Search
USPC ................................. 280/730.2, 743.1, 743.2
See application file for complete search history.

(56) References Cited

U.S. PATENT DOCUMENTS

| | | | | |
|---|---|---|---|---|
| 5,364,125 A * | 11/1994 | Brown et al. | ............... | 280/730.2 |
| 5,957,493 A * | 9/1999 | Larsen et al. | ............... | 280/743.1 |
| 7,828,321 B2 * | 11/2010 | Bakhsh et al. | ............. | 280/730.2 |
| 2006/0033318 A1 * | 2/2006 | Ryan et al. | ................. | 280/743.1 |
| 2006/0097492 A1 * | 5/2006 | Bakhsh et al. | ............. | 280/730.2 |
| 2007/0057491 A1 * | 3/2007 | Bayley | ........................ | 280/730.2 |
| 2010/0264630 A1 * | 10/2010 | Walston | ..................... | 280/730.2 |
| 2011/0266780 A1 * | 11/2011 | Komoll et al. | ............. | 280/730.2 |
| 2013/0001933 A1 * | 1/2013 | Umehara et al. | ........... | 280/730.2 |

* cited by examiner

*Primary Examiner* — Toan To
(74) *Attorney, Agent, or Firm* — Stoel Rives LLP (57) ABSTRACT

An inflatable curtain airbag system can include a first inflatable curtain airbag, a second inflatable curtain airbag, and a reinforced region. In some arrangements, the reinforced region may include a region where a portion of the first inflatable curtain airbag overlaps a portion of the second inflatable curtain airbag. In other arrangements, the reinforced region may include a region where either or both of the first and second inflatable curtain airbags comprise a localized region of increased stiffness.

32 Claims, 9 Drawing Sheets

CURTAIN AIRBAG ASSEMBLY WITH A REINFORCED REGION

TECHNICAL FIELD

The present disclosure relates generally to the field of automotive protective systems. More specifically, the present disclosure relates to inflatable curtain airbag cushions.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered as limiting of the disclosure's scope, the embodiments will be described and explained with specificity and detail in reference to the accompanying drawings.

DETAILED DESCRIPTION

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

The phrases "coupled to" and "in communication with" refer to any form of interaction between two or more entities, including mechanical, electrical, magnetic, electromagnetic, fluid, and thermal interaction. Two components may be coupled to each other even though they are not in direct contact with each other. The terms "abut" and "abutting" refer to items that are in direct physical contact with each other, although the items may not necessarily be attached together.

Inflatable airbag systems are widely used to minimize occupant injury in a collision scenario. Airbag modules or assemblies have been installed at various locations within a vehicle, including, but not limited to, the steering wheel, the instrument panel, within the side doors or side seats, adjacent to the roof rail of the vehicle, in an overhead position, or at the knee or leg position. In the following disclosure, "airbag" generally refers to an inflatable curtain airbag.

Inflatable curtain airbags may be used to protect the passengers of a vehicle during a side collision or roll-over event. Inflatable curtain airbags typically extend longitudinally within the vehicle and may be coupled at or near the belt line of the vehicle. Inflatable curtain airbags may also be coupled to or next to the roof rail of the vehicle. Inflatable curtain airbags may expand in a collision scenario along the side of the vehicle between the vehicle passengers and the side structure of the vehicle. In a deployed state, inflatable curtain airbags may cover at least a portion of the side windows of a vehicle.

Inflatable curtain airbags may be used in a variety of different types of vehicles. For example, the disclosed inflatable curtain airbag systems may be configured for use with 2-door coupes, 4-door coupes (e.g., coupes that have small rear side doors), and convertibles. In certain embodiments, the disclosed inflatable curtain airbag systems may be configured for use with vehicles that do not have a B-pillar. As can be appreciated, many vehicles comprise one or more support structures commonly known as pillars (e.g., A-pillar, B-pillar, C-pillar, etc.). The pillars may serve various functions, including providing support for the roof and/or windows of the vehicle. The pillars may also aid in protecting the vehicle passengers during a side collision or roll-over event.

The pillars may be disposed at various locations along the side structure of the vehicle. For example, an A-pillar may be disposed along the side structure of a vehicle at a car-forward region of the window area; a B-pillar may be disposed along the side structure of a vehicle at an intermediate region of the window area; and a C-pillar may be disposed along the side structure of a vehicle at a car-rearward region of the window area. As can be appreciated, the window area may comprise the windshield, rear and side windows, and is commonly referred to as the greenhouse or glasshouse of the vehicle.

In many vehicles, the intermediate region, or intermediate region of the window area, may be defined by the location of the B-pillar. In other words, the intermediate region is the location where the B-pillar is disposed. However, certain vehicles (e.g., 2-door coupes, 4-door coupes (e.g., coupes that have small rear side doors), and convertibles) are designed without a B-pillar. In these types of vehicles, the intermediate region may be described as the location where the B-pillar would be disposed. The location of the intermediate region may also be described in other ways. For example, the intermediate region may be described as a location that is between the car-forward region and the car-rearward region of the window area. The intermediate region may also be described as the location of the interface or break point between a front side window and a rear side window of the vehicle. The intermediate region may also be described as a location along the side structure of the vehicle that is just behind the front passenger area. Other descriptions of the intermediate region may also be used.

The absence of the B-pillar may impact the safety of the vehicle. For example, the absence of the B-pillar may impact the ability of the vehicle to protect passengers during a side collision or roll-over event. The absence of the B-pillar may also impact the ability of the vehicle to keep passengers from being thrown or otherwise ejected from the vehicle during a side collision or roll-over event.

In some embodiments, the inflatable curtain airbag systems disclosed herein may be configured to provide support for vehicles without a B-pillar. For example, the inflatable curtain airbag systems may comprise a reinforced region that may function as a B-pillar. The inflatable curtain airbag systems may provide first impact collision protection during a side collision or roll-over event. The inflatable curtain airbag systems may also aid in preventing passengers from being thrown or otherwise ejected from the vehicle during a side collision or roll-over event. In some embodiments, the inflatable curtain airbag systems may aid in enabling a vehicle to satisfy certain vehicle safety standards and regulations (e.g., Federal Motor Vehicle Safety Standard ("FMVSS") Nos. 201, 214, and 226 related to Occupant Protection in Interior Impact, Side Impact Protection, and Ejection Mitigation).

Figure 1A:
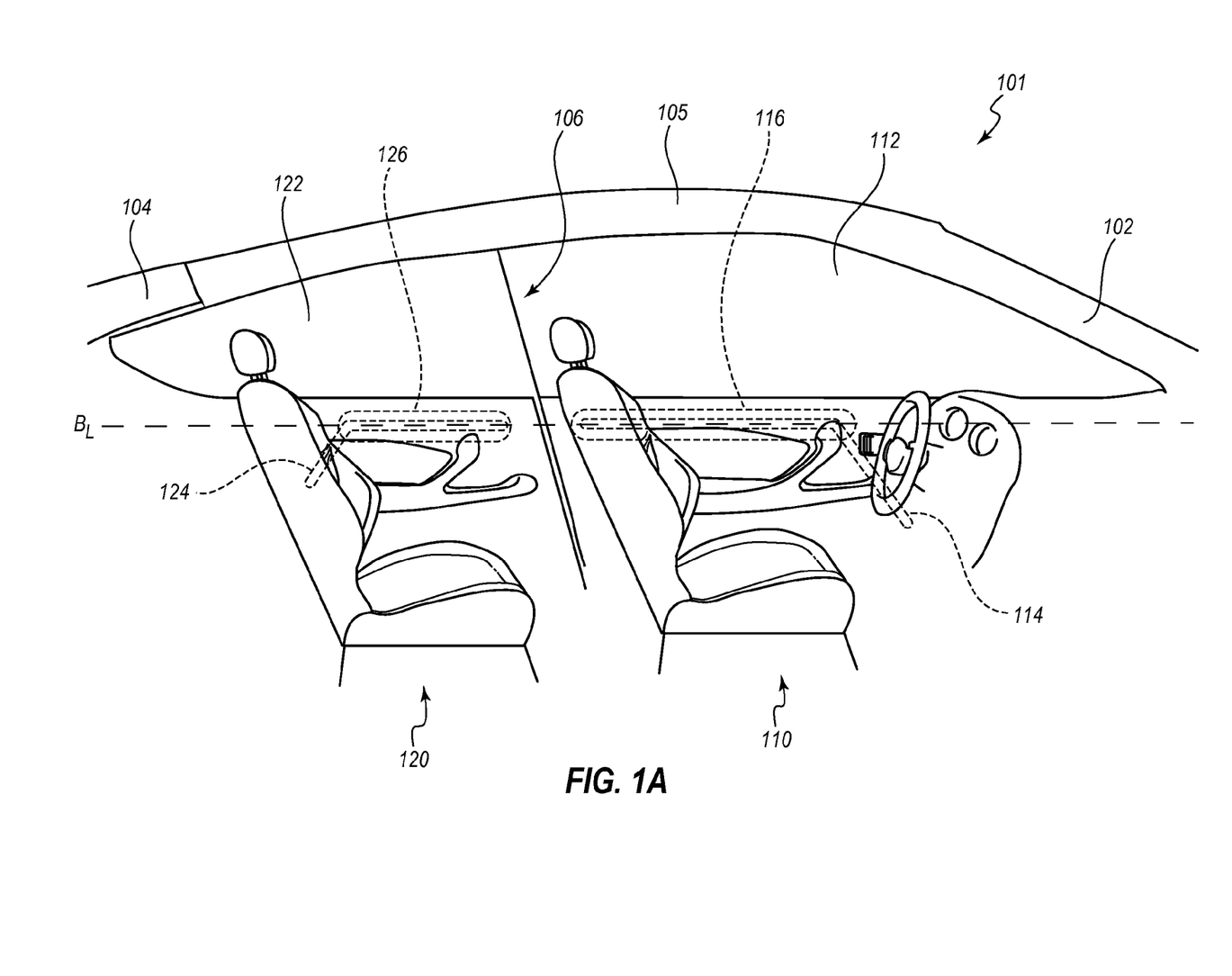
FIG. 1A is a perspective view of an interior side of a vehicle having an inflatable curtain airbag system in a packaged configuration, according to one embodiment of the present disclosure.
Figure 1B:
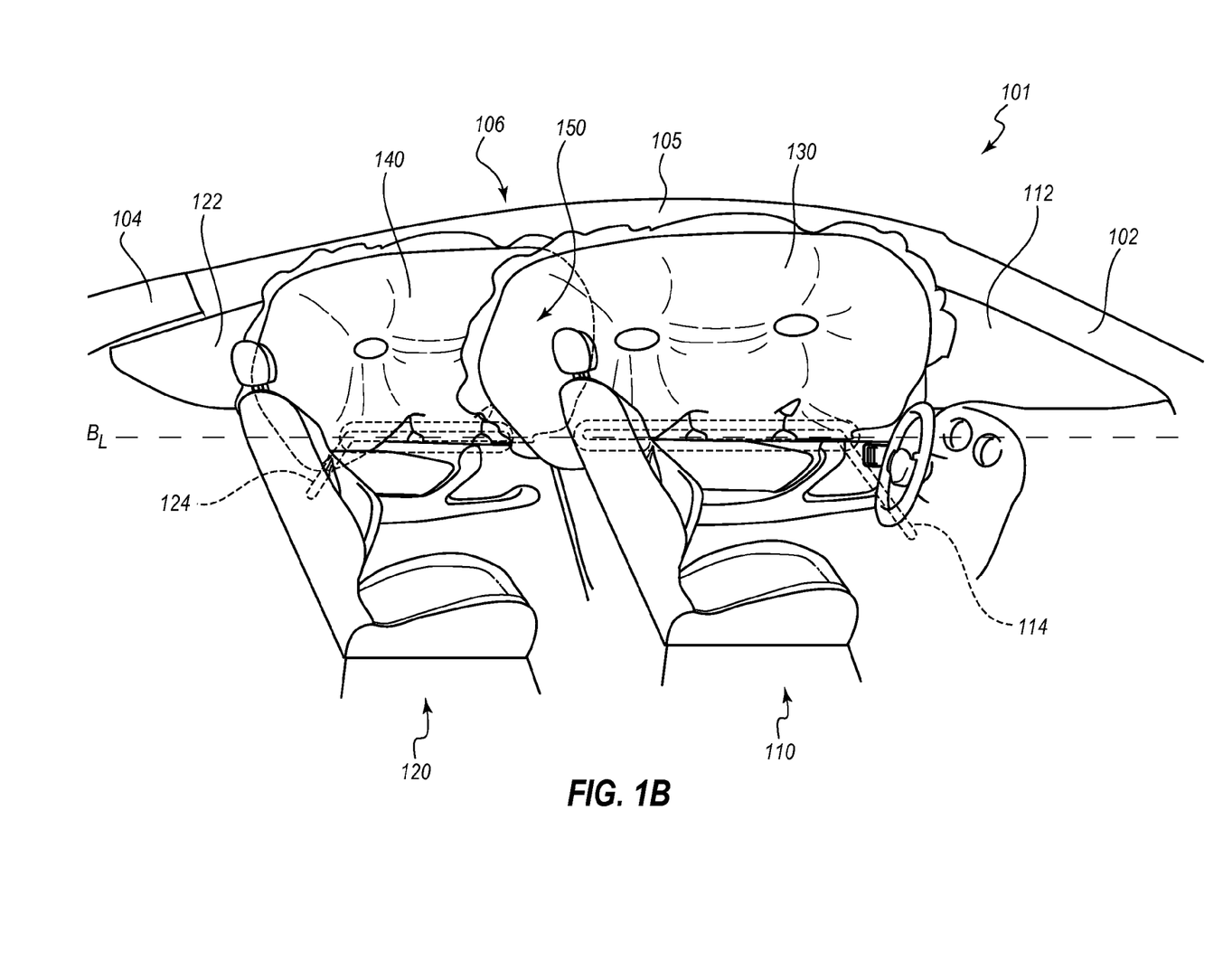
FIG. 1B is a perspective view of the interior side of the vehicle of FIG. 1A, wherein the inflatable curtain airbag system is in a deployed configuration.

FIGS. 1A-1B are perspective views of an interior side of a vehicle 101 depicting an inflatable curtain airbag system in a packaged configuration (FIG. 1A) and a deployed configuration (FIG. 1B). The depicted vehicle 101 is illustrative of a 2-door coupe. As shown in FIGS. 1A-1B, vehicle 101 comprises an A-pillar 102 disposed at a car-forward region of the window area, and a C-pillar 104 disposed at a car-rearward region of the window area. Certain vehicle types (e.g., convertibles) may only comprise an A-pillar 102. Vehicle 101 further comprises an intermediate region 106 that does not comprise a B-pillar. Vehicle 101 may thus be described as having an intermediate region 106 that is free of a B-pillar. Intermediate region 106 is disposed between A-pillar 102 and C-pillar 104. Intermediate region 106 may also be described as being disposed at the location of the interface between a front side window 112 and a rear side window 122 of vehicle 101. As previously discussed, the location of intermediate region 106 may be described in other ways.

As further shown in FIGS. 1A-1B, vehicle 101 may comprise a first seating row 110 which may be described as a front passenger area. In some embodiments, vehicle 101 may further comprise a second seating row 120 which may be described as a rear passenger area. Intermediate region 106 is disposed such that it is just behind first seating row 110 or the front passenger area.

The inflatable curtain airbag system may comprise a first inflatable airbag assembly that comprises a first inflatable curtain airbag 130, and a second inflatable airbag assembly that comprises a second inflatable curtain airbag 140. As indicated by reference areas 116 and 126 of FIG. 1A, the first inflatable curtain airbag may be mounted to a region 116 within a door or integrated in the door trim panel of vehicle 101, and the second inflatable curtain airbag may be mounted within a region 126 of the body or integrated in the side trim panel of vehicle 101. First inflatable curtain airbag 130 may thus be described as a door mounted inflatable cushion (DMIC), and second inflatable curtain airbag 140 may be described as a body mounted inflatable cushion (BMIC). In other embodiments, such as 4-door coupes without a B-pillar for example, second inflatable curtain airbag 140 may be mounted to a rear side door or integrated in a rear side door trim panel of the vehicle. Second inflatable curtain airbag 140 may thus be mounted or integrated with various vehicle structures, including the body or side trim panel, or a rear side door or rear side door trim panel.

With continued reference to FIGS. 1A-1B, first and second inflatable curtain airbags 130, 140 may be mounted at or near the belt line $B_L$ of vehicle 101. In a collision scenario, first and second inflatable curtain airbags 130, 140 may deploy in a direction that is substantially upwards from the belt line $B_L$ towards the roof or roof rail 105 of vehicle 101. However, in embodiments where first and second inflatable curtain airbags 130, 140 are coupled at roof line 105 of vehicle 101, first and second inflatable curtain airbags 130, 140 may deploy in a direction that is substantially downwards.

As can be appreciated, full length gas guides 114, 124 may be mounted just below belt line $B_L$ of vehicle 101 and may be coupled to first and second inflatable curtain airbags 130, 140, respectively. Full length gas guides 114, 124 may be rigid and may be used to stabilize first and second inflatable curtain airbags 130, 140 both during and after deployment. In other embodiments, fabric gas guides may be employed and first and second inflatable curtain airbags 130, 140 may be coupled to the door and/or body structure of a vehicle via one or more tabs and/or brackets.

When in a deployed configuration, as shown in FIG. 1B, first inflatable curtain airbag 130 may be configured to cover or abut at least a portion of front side window 112, and second inflatable curtain airbag 140 may be configured to cover or abut at least a portion of rear side window 122. In some embodiments, first inflatable curtain airbag 130 may extend or bridge between belt line $B_L$ of the door of vehicle 101 and roof rail 105. Second inflatable curtain airbag 140 may extend or bridge between belt line BL of the body of vehicle 101 and roof rail 105.

In certain embodiments, the inflatable curtain airbag system may comprise a reinforced region 150. Reinforced region 150 may be configured such that it is stiffer than other regions of the inflatable curtain airbag system. When in a deployed configuration, reinforced region 150 may provide support for vehicle 101 and may be disposed at intermediate region 106. In some embodiments, reinforced region 150 may function as a B-pillar. Reinforced region 150 may thus be described as being an inflatable B-pillar.

In some embodiments, reinforced region 150 may increase the ability of the inflatable curtain airbag system to provide the passengers of vehicle 101 with first impact collision protection during a side collision or roll-over event. In some embodiments, reinforced region 150 also may increase the ability of the inflatable curtain airbag system to prevent passengers from being thrown or otherwise ejected from vehicle 101 during a side collision or roll-over event.

Reinforced region 150 may be configured in various ways. For example, as shown in FIG. 1B, reinforced region 150 may comprise an region in which a portion of first inflatable curtain airbag 130 overlaps a portion of second inflatable curtain airbag 140. The increased stiffness in reinforced region 150 may be a direct result of the overlap between a portion of first inflatable curtain airbag 130 and second inflatable curtain airbag 140. In some embodiments, reinforced region 150 may extend in a substantially vertical manner from belt line $B_L$ to roof rail 105 of vehicle 101.

In some embodiments, reinforced region 150 may comprise a localized region of increased stiffness within either or both of first inflatable curtain airbag 130 and second inflatable curtain airbag 140. Increasing the stiffness of reinforced region 150 may comprise increasing the pressure in a region within either or both of first inflatable curtain airbag 130 and second inflatable curtain airbag 140. The increased stiffness may thus be a direct result of the increased pressure. In certain embodiments, reinforced region 150 may be described as a high pressure region or zone. Increasing the stiffness of the reinforced region 150 may also be achieved in other ways. For example, increasing the stiffness may comprise varying cushion materials (e.g., employing stiffer materials), adding layers of cushion material, increasing the thickness of the cushion material, adding a reinforcement member, and/or varying the weave of the cushion (e.g., one-piece woven cushion). In some embodiments, reinforced region 150 may comprise both a localized region of increased stiffness and an overlapping region.

Figure 2A:
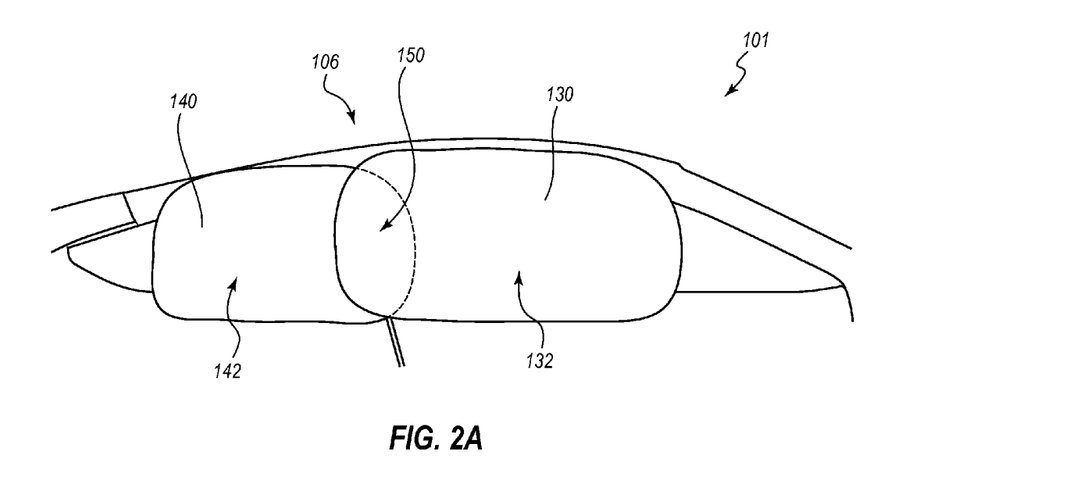
FIG. 2A is a side view of the inflatable curtain airbag system of FIGS. 1A-1B.
Figure 2B:
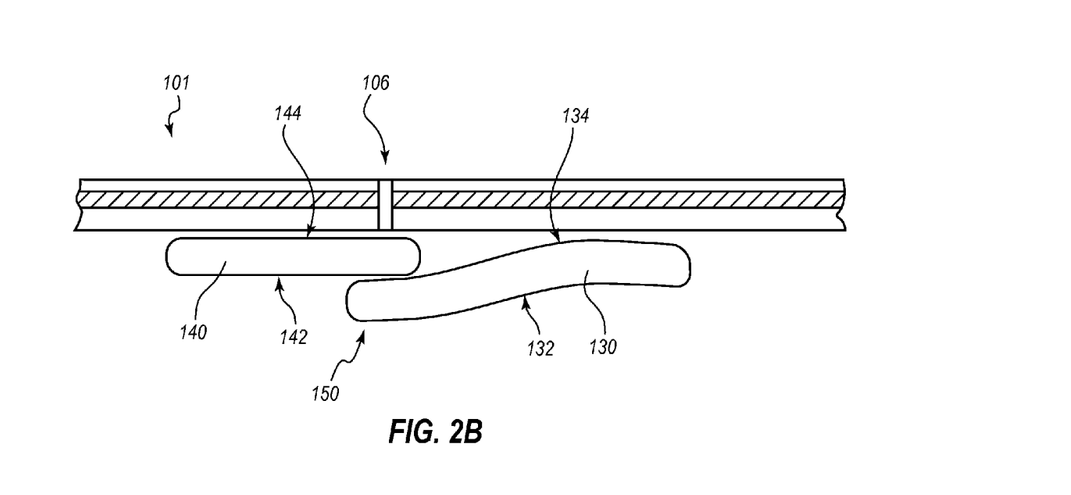
FIG. 2B is a top cross-sectional view of the inflatable curtain airbag system of FIGS. 1A-1B.

FIGS. 2A-2B depict views of the inflatable curtain airbag system of FIGS. 1A-1B, wherein first and second inflatable curtain airbags 130, 140 are in a deployed configuration. More specifically, FIG. 2A is a side view, and FIG. 2B is a top cross sectional view. As shown in FIGS. 2A-2B, reinforced region 150 comprises a region where a portion of first inflatable curtain airbag 130 overlaps a portion of second inflatable curtain airbag 140. Further, reinforced region 150 is disposed at intermediate region 106 of vehicle 101.

As further shown in FIGS. 2A-2B, first inflatable curtain airbag 130 comprises an interior facing surface 132 and an exterior facing surface 134. Similarly, second inflatable curtain airbag 140 comprises an interior facing surface 142 and an exterior facing surface 144. Interior facing surfaces 132, 142 may be described as being directed towards the vehicle passengers or inside of vehicle 101, and exterior facing surfaces 134, 144 may be described as being directed towards vehicle 101 or outside of vehicle 101.

As shown in FIG. 2B, at reinforced region 150, exterior facing surface 134 of first inflatable curtain airbag 130 abuts interior facing surface 142 of second inflatable curtain airbag 140. The overlapping portion of first inflatable curtain airbag 130 may thus be described as being disposed towards the inside of vehicle 101, while the overlapping portion of second inflatable curtain airbag 140 may be described as being disposed towards the outside of vehicle 101. In other embodiments, the overlapping portion of first inflatable curtain airbag 130 may be disposed towards the outside of vehicle 101, while the overlapping portion of second inflatable curtain airbag 140 may be disposed towards the inside of vehicle 101. Increased stiffness in reinforced region 150 may be the direct result of the overlapping region.

Figure 3A:
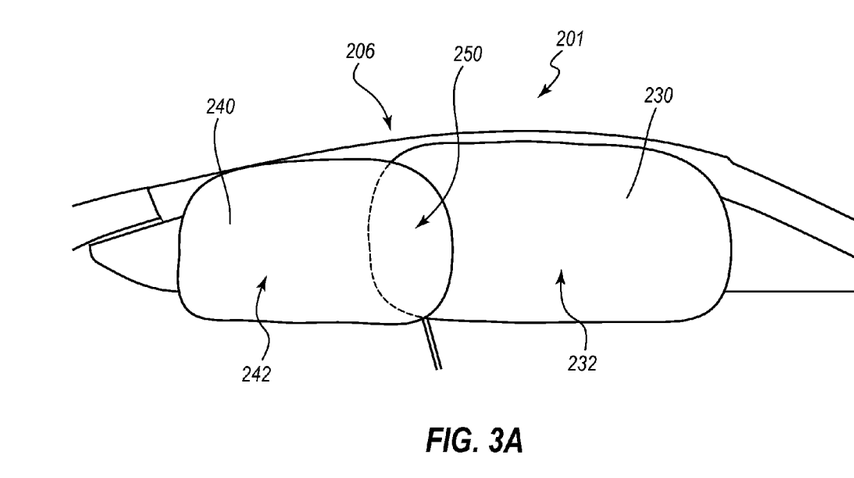
FIG. 3A is a side view of another embodiment of an inflatable curtain airbag system.
Figure 3B:
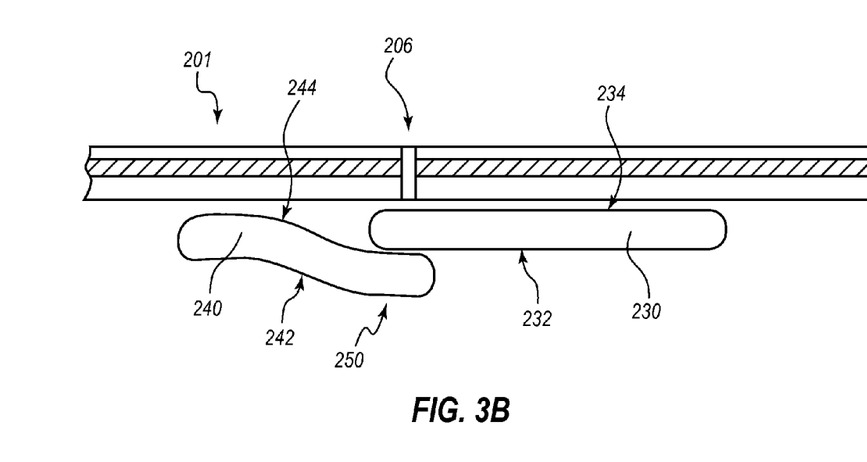
FIG. 3B is a top cross-sectional view of the inflatable curtain airbag system of FIG. 3A.

FIGS. 3A-3B depict another embodiment of an inflatable curtain airbag system, wherein first and second inflatable curtain airbags 230, 240 are in a deployed configuration. More specifically, FIG. 3A is a side view, and FIG. 3B is a top cross-sectional view. The inflatable curtain airbag system can, in certain respects, resemble components of the inflatable curtain airbag system described in connection with FIGS. 1A-1B above. It will be appreciated that the illustrated embodiments may have analogous features. Accordingly, like features are designated with like reference numerals, with the leading digits incremented to "2." (For instance, first inflatable curtain airbag is designated "130" in FIGS. 1A-1B, and an analogous first inflatable curtain airbag is designated as "230" in FIGS. 3A-3B.) Relevant disclosure set forth above regarding similarly identified features thus may not be repeated hereafter. Moreover, specific features of the inflatable curtain airbag system and related components shown in FIGS. 3A-3B may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the inflatable curtain airbag system of FIGS. 3A-3B. Any suitable combination of the features, and variations of the same, described with respect to the inflatable curtain airbag system and components illustrated in FIGS. 1A-1B, can be employed with the inflatable curtain airbag system and components of FIGS. 3A-3B, and vice versa. This pattern of disclosure applies equally to further embodiments depicted in subsequent figures and described hereafter.

As shown in FIGS. 3A-3B, reinforced region 250 comprises a region where a portion of first inflatable curtain airbag 230 overlaps a portion of second inflatable curtain airbag 240. Reinforced region 250 is further disposed at intermediate region 206 of vehicle 201.

Like the embodiment of FIGS. 2A-2B, first inflatable curtain airbag 230 comprises an interior facing surface 232 and an exterior facing surface 234. Similarly, second inflatable curtain airbag 240 comprises an interior facing surface 242 and an exterior facing surface 244. Interior facing surfaces 232, 242 may be described as being directed towards the vehicle passengers or inside of vehicle 201, and exterior facing surfaces 234, 244 may be described as being directed towards vehicle 201 or outside of vehicle 201.

As shown in FIG. 3B, at reinforced region 250 interior facing surface 232 of first inflatable curtain airbag 230 abuts exterior facing surface 244 of second inflatable curtain airbag 240. The overlapping portion of first inflatable curtain airbag 230 may thus be described as being disposed towards the outside of vehicle 201, while the overlapping portion of second inflatable curtain airbag 240 may be described as being disposed towards the inside of vehicle 201. Increased stiffness in reinforced region 250 may be the direct result of the overlapping region.

Figure 4A:
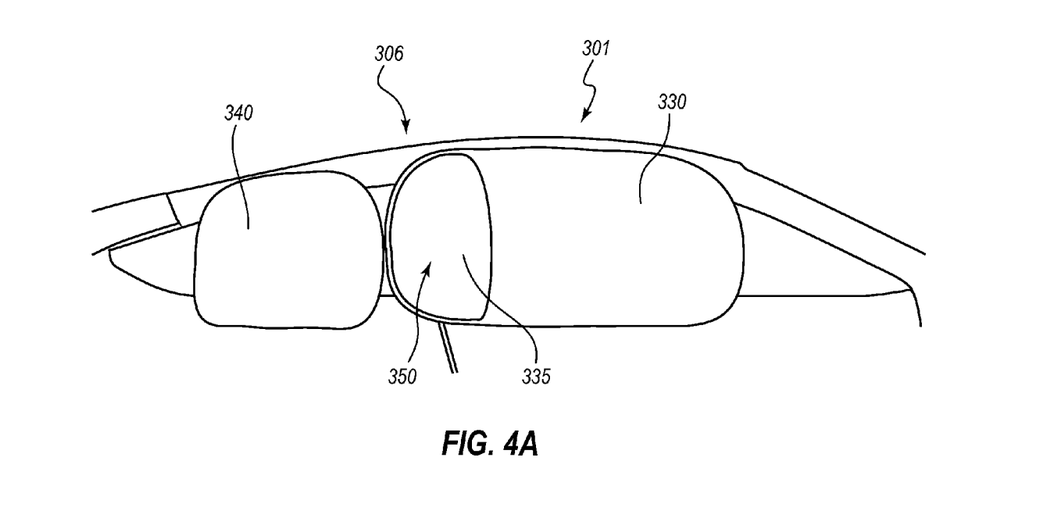
FIG. 4A is a side view of another embodiment of an inflatable curtain airbag system.
Figure 4B:
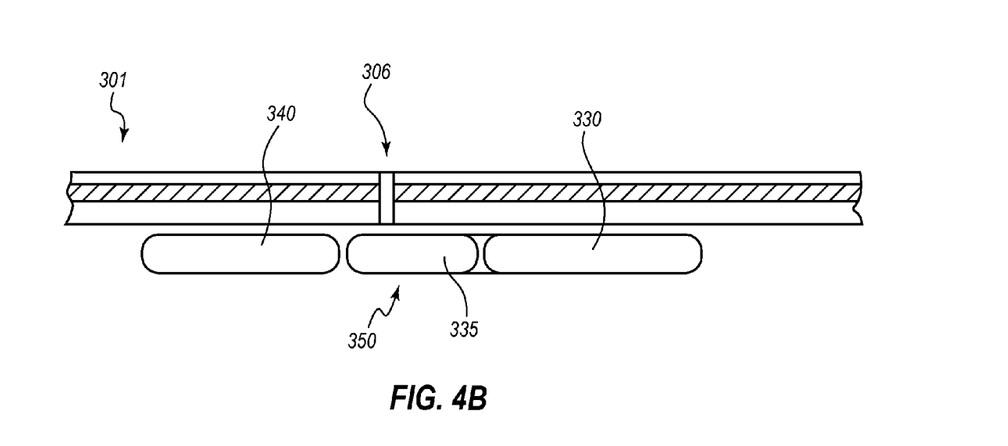
FIG. 4B is a top cross-sectional view of the inflatable curtain airbag system of FIG. 4A.

FIGS. 4A-4B depict another embodiment of an inflatable curtain airbag system, wherein first and second inflatable curtain airbags 330, 340 are in a deployed configuration. More specifically, FIG. 4A is a side view, and FIG. 4B is a top cross-sectional view. As shown in FIGS. 4A-4B, reinforced region 350 may comprise a localized region of increased stiffness within either or both of first inflatable curtain airbag 330 and second inflatable curtain airbag 340. Reinforced region 350 is further disposed at intermediate region 306 of vehicle 301.

In FIGS. 4A-4B, first inflatable curtain airbag 330 comprises a localized region 335 of increased stiffness. As previously discussed, region 335 of increased stiffness may be a result of increased pressure within first inflatable curtain airbag 330. The pressure in region 335 may thus be greater than the pressure in the remaining portions of first inflatable curtain airbag 330. The pressure in region 335 may also be greater than the pressure in second inflatable curtain airbag 340. Other means of achieving greater stiffness may also be used.

As further shown in FIGS. 4A-4B, first and second inflatable curtain airbags 330, 340 do not substantially overlap when in the deployed configuration. In other embodiments, first and second inflatable curtain airbags 330, 340 may overlap as shown in FIGS. 2A-2B and 3A-3B.

Figure 5A:
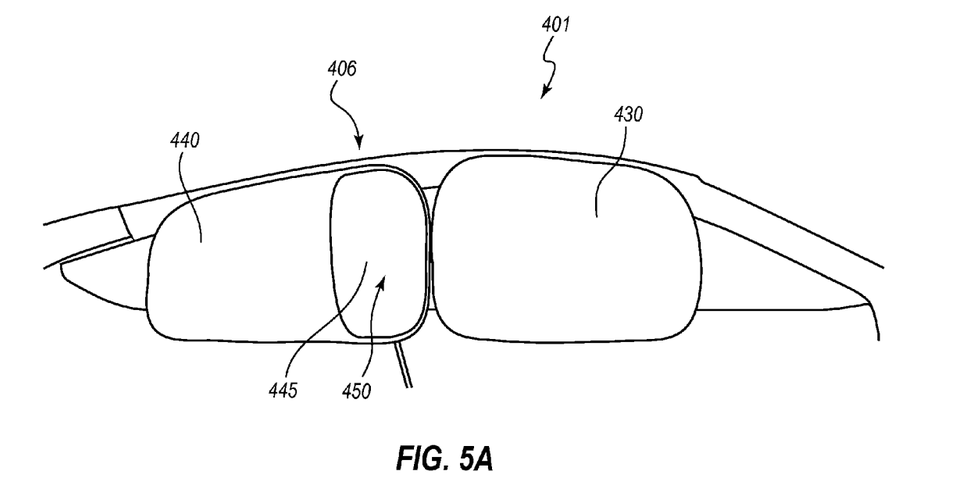
FIG. 5A is a side view of another embodiment of an inflatable curtain airbag system.
Figure 5B:
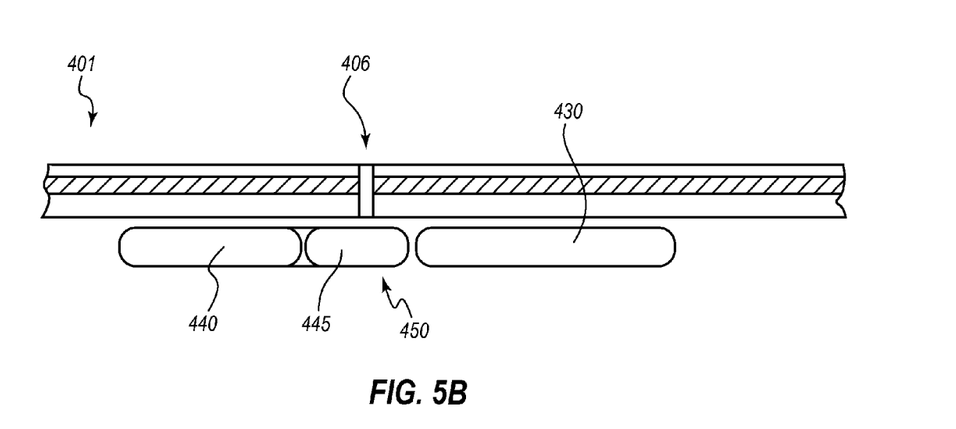
FIG. 5B is a top cross-sectional view of the inflatable curtain airbag system of FIG. 5A.

FIGS. 5A-5B depict another embodiment of an inflatable curtain airbag system, wherein first and second inflatable curtain airbags 430, 440 are in a deployed configuration. More specifically, FIG. 5A is a side view, and FIG. 5B is a top cross-sectional view. As shown in FIGS. 5A-5B, reinforced region 450 may comprise a localized region of increased stiffness within either or both of first inflatable curtain airbag 430 and second inflatable curtain airbag 440. Reinforced region 450 is further disposed at intermediate region 406 of vehicle 401.

In FIGS. 5A-5B, second inflatable curtain airbag 440 comprises a localized region 445 of increased stiffness. As previously discussed, region 445 of increased stiffness may be the result of increased pressure within second inflatable curtain airbag 440. The pressure in region 445 may thus be greater than the pressure in the remaining portions of second inflatable curtain airbag 440. The pressure in region 445 may also be greater than the pressure in first inflatable curtain airbag 430. Other means of achieving greater stiffness may also be used.

As further shown in FIGS. 5A-5B, first and second inflatable curtain airbags 430, 440 do not substantially overlap when in the deployed configuration. In other embodiments, first and second inflatable curtain airbags 430, 440 may overlap as shown in FIGS. 2A-2B and 3A-3B.

Figure 6A:
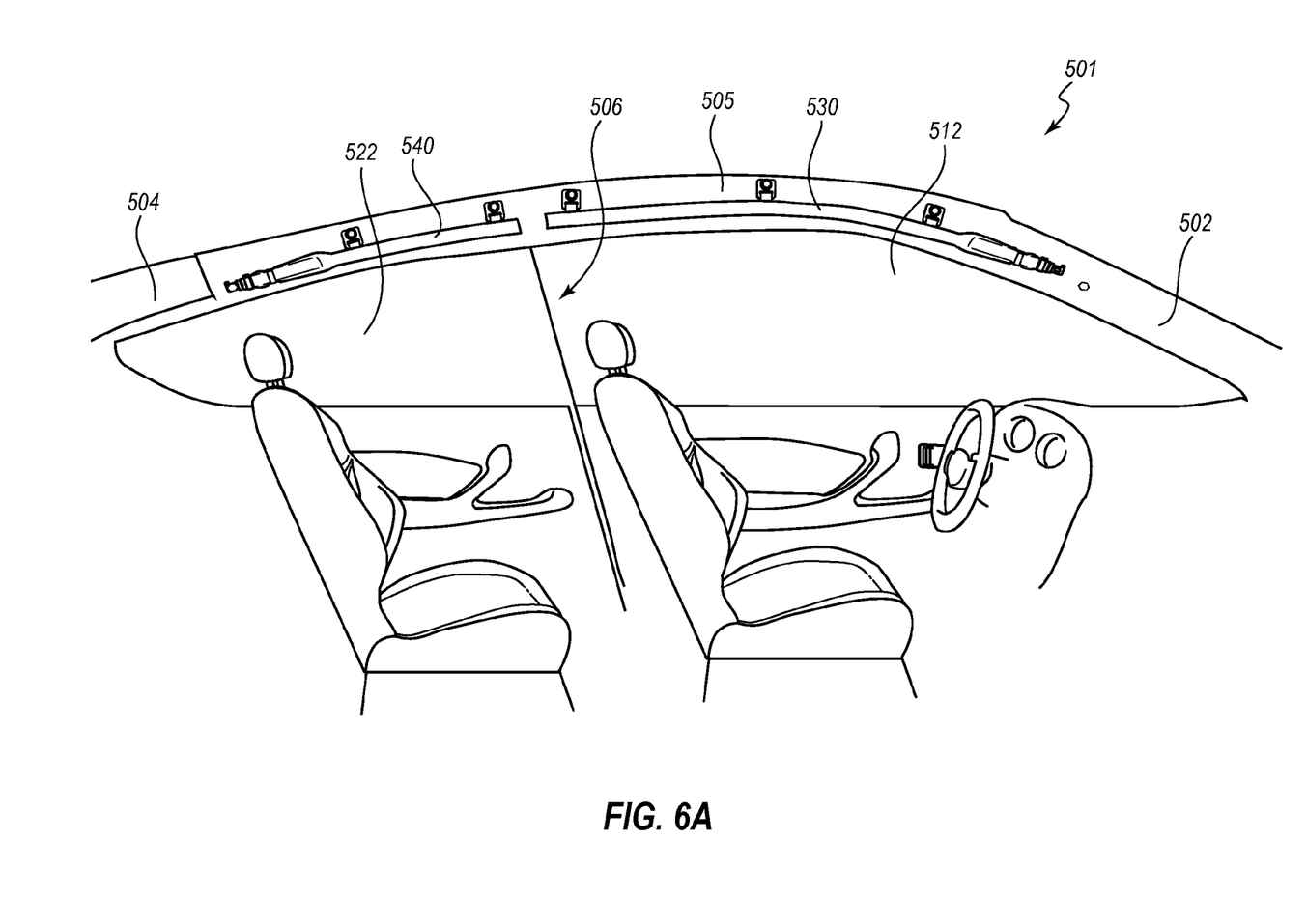
FIG. 6A is a perspective view of an interior side of a vehicle having an inflatable curtain airbag system in a packaged configuration, according to another embodiment of the present disclosure
Figure 6B:
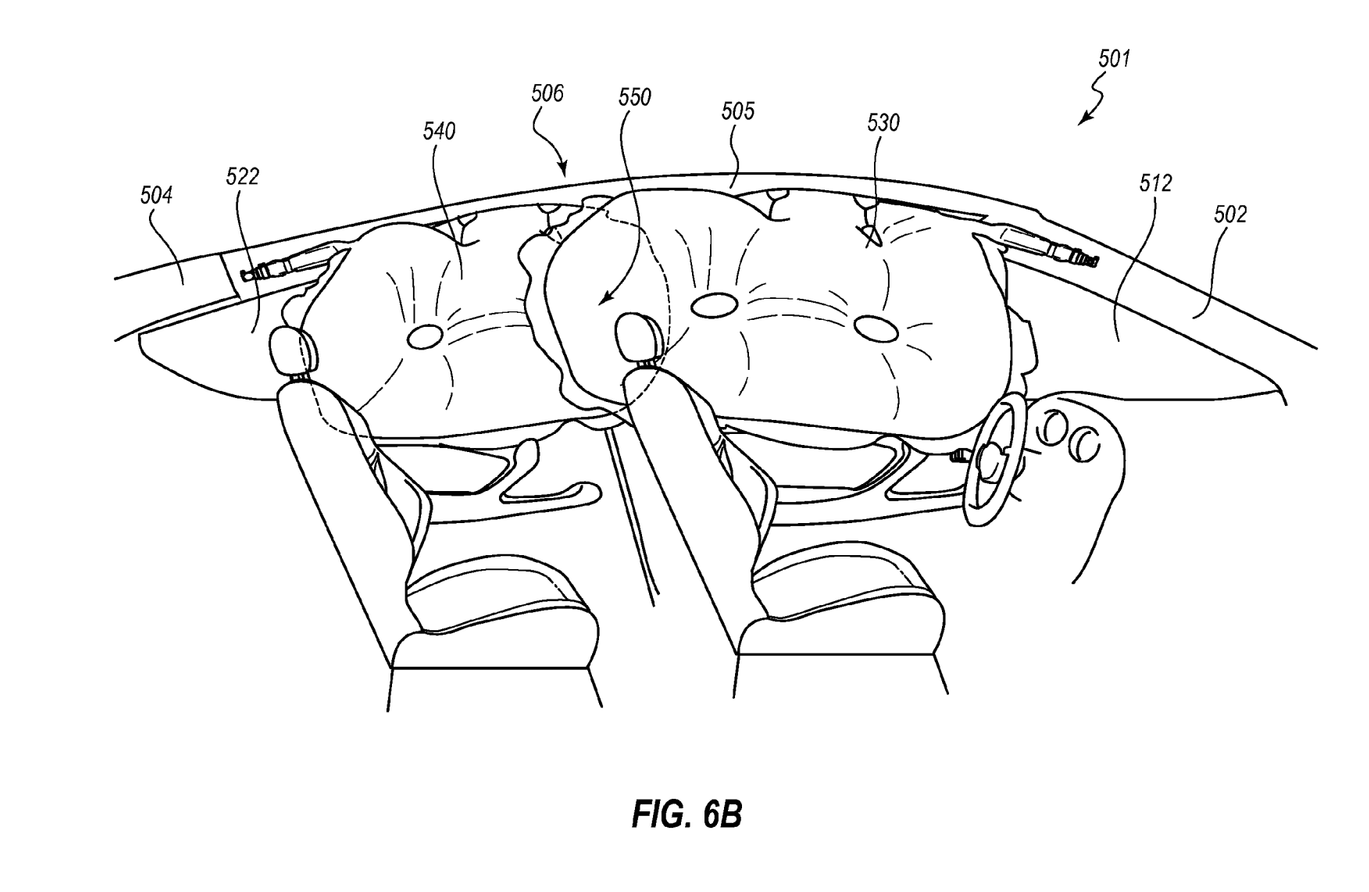
FIG. 6B is a perspective view of the interior side of the vehicle of FIG. 6A, wherein the inflatable curtain airbag system is in a deployed configuration.

FIGS. 6A-6B are perspective views of an interior side of a vehicle 501 depicting an inflatable curtain airbag system in a packaged configuration (FIG. 6A) and a deployed configuration (FIG. 6B), according to another embodiment of the present disclosure. As shown in FIGS. 6A-6B, vehicle 501 comprises an A-pillar 502 and a C-pillar 504. Vehicle 501 comprises an intermediate region 506 that does not comprise a B-pillar. Intermediate region 506 is disposed at the location of the interface between a front side window 512 and a rear side window 522 of vehicle 501.

The depicted inflatable curtain airbag system comprises a first inflatable airbag assembly that comprises a first inflatable curtain airbag 530, and a second inflatable airbag assembly that comprises a second inflatable curtain airbag 540, each of which is mounted to the roof rail 505 of vehicle 501. In a collision scenario, first and second inflatable curtain airbags 530, 540 deploy in a direction that is substantially downwards towards the floor of vehicle 501.

When in a deployed configuration, as shown in FIG. 6B, first inflatable curtain airbag 530 may be configured to cover or abut at least a portion of front side window 512, and second inflatable curtain airbag 540 may be configured to cover or abut at least a portion of rear side window 522. When deployed, the inflatable curtain airbag system also comprises a reinforced region 550 having increased stiffness. In reinforced region 550 of the depicted embodiment, a portion of first inflatable curtain airbag 530 overlaps a portion of second inflatable curtain airbag 540.

Figure 7:
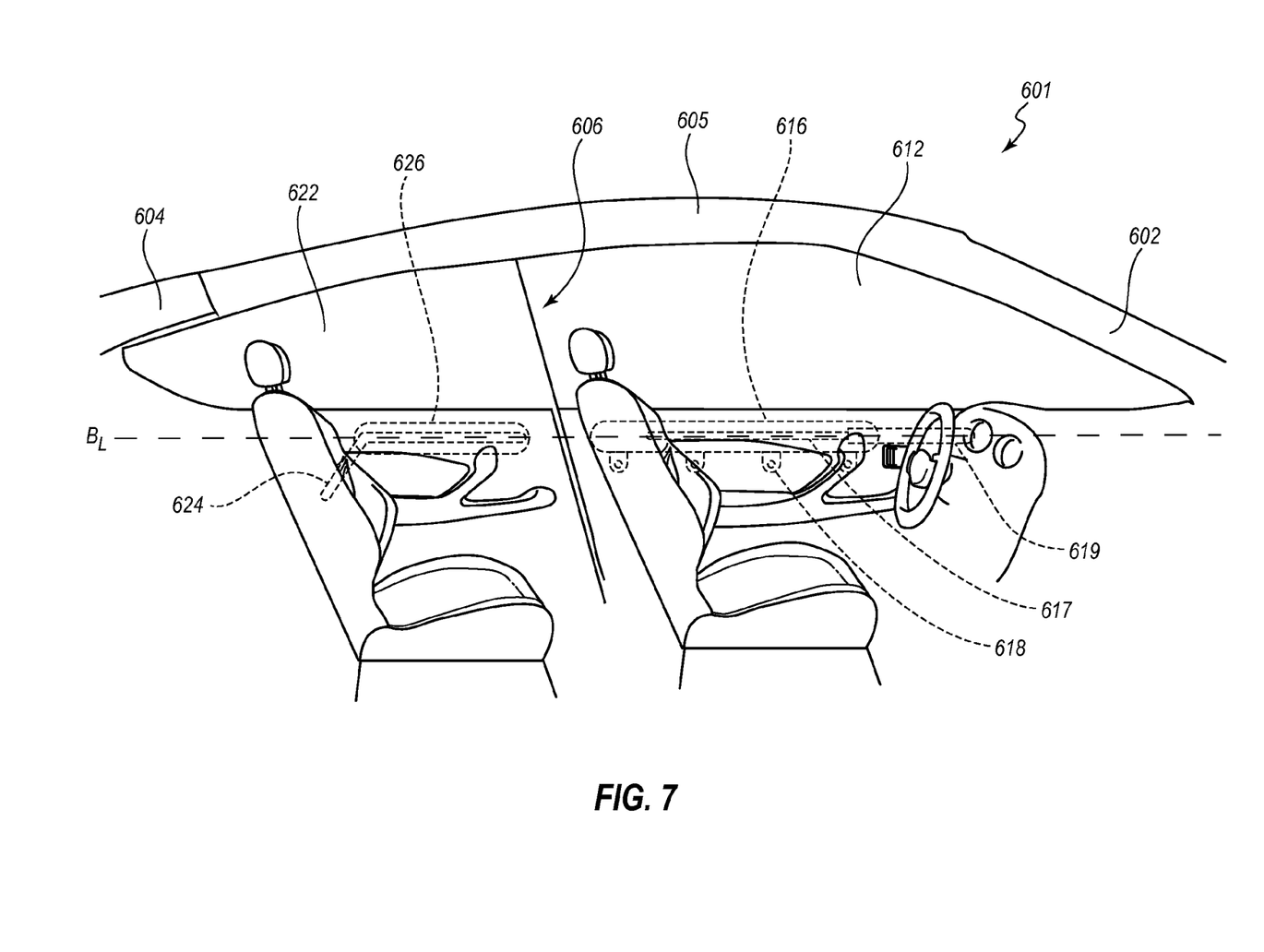
FIG. 7 is a perspective view of an interior side of a vehicle having an inflatable curtain airbag system in a packaged configuration, according to another embodiment of the present disclosure.

FIG. 7 is a perspective view of an interior side of a vehicle 601 depicting an inflatable curtain airbag system in a packaged configuration, according to another embodiment of the present disclosure. As shown in FIG. 7, vehicle 601 comprises an A-pillar 602 and a C-pillar 604. Vehicle 601 comprises an intermediate region 606 that does not comprise a B-pillar. Intermediate region 606 is disposed at the location of the interface between a front side window 612 and a rear side window 622 of vehicle 601.

The depicted inflatable curtain airbag system comprises a first inflatable airbag assembly that comprises a first inflatable curtain airbag, and a second inflatable airbag assembly that comprises a second inflatable curtain airbag. As indicated by reference areas 616 and 626, the first inflatable curtain airbag is mounted to a region 616 within a door or integrated in the door trim panel of vehicle 601, and the second inflatable curtain airbag is mounted within a region 626 of the body or integrated in the side trim panel of vehicle 601. First and second inflatable curtain airbags are mounted at or near the belt line $B_L$. In a collision scenario, first and second inflatable curtain airbags are configured to deploy in a direction that is substantially upwards from the belt line $B_L$ towards the roof or roof rail 605 of vehicle 601.

As further depicted in FIG. 7, gas guides 617, 624 may be mounted just below belt line $B_L$ of vehicle 601. Gas guides 617, 624 may be coupled to first and second inflatable curtain airbags. Gas guides 617, 624 may be rigid or may be made of fabric. For example, in some embodiments, gas guide 624 is a rigid full length gas guide, and gas guide 617 is made of fabric. As depicted in FIG. 7, a fabric gas guide 617 may be coupled to an inflator 619, and one or more tabs and/or brackets 618 may be used to couple the first inflatable curtain airbag to the vehicle door thereby stabilizing the first inflatable curtain airbag both during and after deployment.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. §112 ¶ 6. It will be apparent to those having skill in the art that changes may be made to the details of the above-described embodiments without departing from the underlying principles of the invention. Embodiments of the invention in which an exclusive property or privilege is claimed are defined as follows.

The invention claimed is:

1. An inflatable curtain airbag system comprising a reinforced region, wherein the inflatable curtain airbag system comprises:
   a first inflatable airbag assembly comprising a first inflatable curtain airbag that is configured to be mounted to a door of a vehicle structure, wherein the first inflatable curtain airbag is configured to deploy upwardly from the door of the vehicle structure in a direction that is towards a roof of the vehicle structure;
   a second inflatable airbag assembly comprising a second inflatable curtain airbag that is configured to be mounted to a body of the vehicle structure, wherein the second inflatable curtain airbag is configured to deploy upwardly from the body of the vehicle structure in a direction that is towards the roof of the vehicle structure; and
   a reinforced region, wherein when the inflatable curtain airbag system is in a deployed configuration, the reinforced region is disposed at an intermediate region of the vehicle structure.

2. The inflatable curtain airbag system of claim 1, wherein the reinforced region comprises a region wherein a portion of the first inflatable curtain airbag overlaps a portion of the second inflatable curtain airbag.

3. The inflatable curtain airbag system of claim 2, wherein the portion of the first inflatable curtain airbag overlaps the portion of the second inflatable curtain airbag such that a portion of an exterior facing surface of the first inflatable curtain airbag abuts a portion of an interior facing surface of the second inflatable curtain airbag.

4. The inflatable curtain airbag system of claim 2, wherein the portion of the first inflatable curtain airbag overlaps the portion of the second inflatable curtain airbag such that a portion of an interior facing surface of the first inflatable curtain airbag abuts a portion of an exterior facing surface of the second inflatable curtain airbag.

5. The inflatable curtain airbag system of claim 1, wherein the reinforced region comprises a region of increased stiffness within either or both of the first inflatable curtain airbag and the second inflatable curtain airbag.

6. The inflatable curtain airbag system of claim 5, wherein the reinforced region comprises a region of increased stiffness within the first inflatable curtain airbag.

7. The inflatable curtain airbag system of claim 5, wherein the reinforced region comprises a region of increased stiffness within the second inflatable curtain airbag.

8. The inflatable curtain airbag system of claim 5, wherein the region of increased stiffness is the result of increased pressure within a region of either or both of the first inflatable curtain airbag and the second inflatable curtain airbag.

9. The inflatable curtain airbag system of claim 5, wherein the region of increased stiffness comprises a region within either or both of the first inflatable curtain airbag and the second inflatable curtain airbag that comprises thicker material.

10. The inflatable curtain airbag system of claim 5, wherein the region of increased stiffness comprises a region within either or both of the first inflatable curtain airbag and the second inflatable curtain airbag that comprises additional layers of material.

11. The inflatable curtain airbag system of claim 5, wherein the region of increased stiffness comprises a region within either or both of the first inflatable curtain airbag and the second inflatable curtain airbag that comprises stiffer material.

12. The inflatable curtain airbag system of claim 5, wherein the region of increased stiffness comprises a region within either or both of the first inflatable curtain airbag and the second inflatable curtain airbag that comprises a reinforcement member.

13. The inflatable curtain airbag system of claim 5, wherein the region of increased stiffness is the result of varying the weave of a region within either or both of the first inflatable curtain airbag and the second inflatable curtain airbag.

14. The inflatable curtain airbag system of claim 1, wherein the intermediate region of the vehicle structure is located at an interface between a front side window of the vehicle structure and a rear side window of the vehicle structure.

15. An inflatable curtain airbag system configured to be mounted to a vehicle structure having an A-pillar and a C-pillar without a B-pillar in between, the inflatable curtain airbag system, comprising:
 a first inflatable airbag assembly comprising a first inflatable curtain airbag that is configured to be mounted to a door of the vehicle structure, wherein the first inflatable curtain airbag is configured to deploy upwardly from the door of the vehicle structure in a direction that is towards a roof of the vehicle structure;
 a second inflatable airbag assembly comprising a second inflatable curtain airbag that is configured to be mounted to a vehicle structure, wherein the second inflatable curtain airbag is configured to deploy upwardly in a direction that is towards the roof of the vehicle structure; and
 a reinforced region, wherein when the inflatable curtain airbag system is in a deployed configuration, the reinforced region is disposed at an intermediate region of the vehicle structure, wherein the intermediate region is located at an interface between a front side window of the vehicle structure and a rear side window of the vehicle structure.

16. The inflatable curtain airbag system of claim 15, wherein the second inflatable curtain airbag is configured to be mounted to a body of the vehicle structure.

17. The inflatable curtain airbag system of claim 15, wherein the second inflatable curtain airbag is configured to be mounted to a rear side door of the vehicle structure.

18. The inflatable curtain airbag system of claim 15, wherein the reinforced region comprises a region wherein a portion of the first inflatable curtain airbag overlaps a portion of the second inflatable curtain airbag.

19. The inflatable curtain airbag system of claim 18, wherein the portion of the first inflatable curtain airbag overlaps the portion of the second inflatable curtain airbag such that a portion of an exterior facing surface of the first inflatable curtain airbag abuts a portion of an interior facing surface of the second inflatable curtain airbag.

20. The inflatable curtain airbag system of claim 18, wherein the portion of the first inflatable curtain airbag overlaps the portion of the second inflatable curtain airbag such that a portion of an interior facing surface of the first inflatable curtain airbag abuts a portion of an exterior facing surface of the second inflatable curtain airbag.

21. The inflatable curtain airbag system of claim 15, wherein the reinforced region comprises a region of increased stiffness within either or both of the first inflatable curtain airbag and the second inflatable curtain airbag.

22. The inflatable curtain airbag system of claim 21, wherein the reinforced region comprises a region of increased stiffness within the first inflatable curtain airbag.

23. The inflatable curtain airbag system of claim 21, wherein the reinforced region comprises a region of increased stiffness within the second inflatable curtain airbag.

24. The inflatable curtain airbag system of claim 21, wherein the region of increased stiffness is the result of increased pressure within a region of either or both of the first inflatable curtain airbag and the second inflatable curtain airbag.

25. The inflatable curtain airbag system of claim 21, wherein the region of increased stiffness comprises a region within either or both of the first inflatable curtain airbag and the second inflatable curtain airbag that comprises thicker material.

26. The inflatable curtain airbag system of claim 21, wherein the region of increased stiffness comprises a region within either or both of the first inflatable curtain airbag and the second inflatable curtain airbag that comprises additional layers of material.

27. The inflatable curtain airbag system of claim 21, wherein the region of increased stiffness comprises a region within either or both of the first inflatable curtain airbag and the second inflatable curtain airbag that comprises stiffer material.

28. The inflatable curtain airbag system of claim 21, wherein the region of increased stiffness comprises a region within either or both of the first inflatable curtain airbag and the second inflatable curtain airbag that comprises a reinforcement member.

29. The inflatable curtain airbag system of claim 21, wherein the region of increased stiffness is the result of varying the weave of a region within either or both of the first inflatable curtain airbag and the second inflatable curtain airbag.

30. An inflatable curtain airbag system configured to be mounted to a vehicle structure having an A-pillar and a C-pillar without a B-pillar in between, the inflatable curtain airbag system, comprising:
   a first inflatable airbag assembly comprising a first inflatable curtain airbag that is configured to be mounted to a door of the vehicle structure, wherein the first inflatable curtain airbag is configured to deploy upwardly from the door of the vehicle structure in a direction that is towards a roof of the vehicle structure;
   a second inflatable airbag assembly comprising a second inflatable curtain airbag that is configured to be mounted to the vehicle structure, wherein the second inflatable curtain airbag is configured to deploy upwardly in a direction that is towards the roof of the vehicle structure; and
   a reinforced region, wherein when the inflatable curtain airbag system is in a deployed configuration, the reinforced region is disposed at an intermediate region of the vehicle structure, wherein the reinforced region comprises a region wherein a portion of the first inflatable curtain airbag overlaps a portion of the second inflatable curtain airbag such that a portion of an exterior facing surface of the first inflatable curtain airbag abuts a portion of an interior facing surface of the second inflatable curtain airbag.

31. The inflatable curtain airbag system of claim 30, wherein the second inflatable curtain airbag is configured to be mounted to a body of the vehicle structure.

32. The inflatable curtain airbag system of claim 30, wherein the second inflatable curtain airbag is configured to be mounted to a rear side door of the vehicle structure.

* * * * *